(12) United States Patent
Paila et al.

(10) Patent No.: US 8,527,425 B2
(45) Date of Patent: Sep. 3, 2013

(54) LEGAL TEXT DISTRIBUTION AND PROCESSING IN MOBILE BROADCASTING

(71) Applicant: Core Wireless Licensing S.a.r.l., Luxembourg (LU)

(72) Inventors: Toni Paila, Rye, NY (US); Francesco Balestrieri, Helsinki (FI); Tuomo Saarikivi, Helsinki (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 13/677,497

(22) Filed: Nov. 15, 2012

(65) Prior Publication Data

US 2013/0073696 A1    Mar. 21, 2013

Related U.S. Application Data

(63) Continuation of application No. 11/555,061, filed on Oct. 31, 2006, now Pat. No. 8,332,327.

(51) Int. Cl.
*G06Q 30/00*    (2012.01)
*G06Q 99/00*    (2006.01)

(52) U.S. Cl.
USPC .............................................. 705/59; 705/1.1

(58) Field of Classification Search
USPC .................................................. 705/1.1, 59
See application file for complete search history.

(56) References Cited

U.S. PATENT DOCUMENTS

| | | | | |
|---|---|---|---|---|
| 2001/0051996 A1* | 12/2001 | Cooper et al. | | 709/217 |
| 2002/0052933 A1* | 5/2002 | Leonhard et al. | | 709/219 |
| 2004/0019578 A1* | 1/2004 | Kalmes et al. | | 707/1 |
| 2005/0071226 A1* | 3/2005 | Nguyen et al. | | 705/14 |
| 2005/0080838 A1* | 4/2005 | Colby et al. | | 709/200 |
| 2006/0005256 A1* | 1/2006 | Cox | | 726/27 |
| 2007/0061860 A1* | 3/2007 | Walker et al. | | 725/117 |
| 2007/0238450 A1* | 10/2007 | Hogberg | | 455/418 |

FOREIGN PATENT DOCUMENTS

| | | |
|---|---|---|
| WO | 2004084459 A2 | 9/2004 |
| WO | WO2004/084459 A2 * | 9/2004 |

OTHER PUBLICATIONS

PCT International Search Report and Written Opinion, International Application PCT/IB2007/003104, Mailed April 8, 2008, 10 PP.
OMA-BCAST-2006-0921-INP_Legal_Text_Support, Open Mobile Alliance Ltd., Nov. 3, 2006, 6 pages.

* cited by examiner

*Primary Examiner* — James D Nigh

(57) ABSTRACT

Systems and methods for processing and distributing legal text information allow content providers to distribute legal text to terminals receiving broadcast content. The legal text may include terms and conditions associated with content that a user may want to purchase or subscribe. Upon receiving a content selection that a user wishes to purchase, a terminal may determine whether the content is associated with legal text information. If so, the legal text may be obtained and rendered for the user. The terminal may further determine whether user consent is required and if so, prompt the user with a consent agreement. Legal text information may be obtained in a variety of manners including from a service provisioning system, from a local cache in the terminal and/or from a file delivery server. Communication of legal text information may further be conducted using messages storing legal text attributes and elements.

18 Claims, 14 Drawing Sheets

| Name | Type | Category | Cardinality | Description | Data Type |
|---|---|---|---|---|---|
| Service Guide Delivery Descriptor | E | | | Attributes: BSDAid SGDDid SGDDversion Version-ID-Length Contains the following sub-element: NotificationReception LegalTextReception DescriptorEntry | |
| ... | | | | | |
| LegalText Reception | E1 | NO/TM | 1 | Reception information for system wide legal text file carousel. Contains attributes: LegalTextReceptionPort LegalTextReceptionAddress | |
| LegalText ReceptionPort | A | NO/TM | 0..1 | UDP Port number, delivery over Broadcast Channel. | integer |
| LegalText Reception Address | A | NO/TM | 0..1 | IP multicast address; delivery over Broadcast Channel. | string |
| ... | | | | | |

Figure 4

| Name | Type | Category | Cardinality | Description | Data Type |
|---|---|---|---|---|---|
| PurchaseItem | E | | | Attributes:<br>id<br>version<br>validFrom<br>validTo<br>GlobalPurchaseItemId<br>Weight<br>Closed<br><br>Sub-elements:<br>ServiceIDRef<br>ScheduleReference<br>ContentIDRef<br>PurchaseItemIDRef<br>Name<br>Description<br>LegalText<br>StartTime<br>EndTime<br>ParentalRating<br>ExtensionURL<br>PurchaseDataIDRef<br>Dependencies<br>Exclusions | |
| . . . | | | | | |
| | | | | Start of program guide<br><br>Program Guide elements:<br>Name<br>Description<br>LegalText<br>StartTime<br>EndTime<br>ParentalRating<br>ExtensionURL | |
| . . . | | | | | |
| LegalText | E1 | O | 0..1 | Attributes:<br><br>LegalTextURI<br>UserConsentRequired<br><br>Sub-elements:<br><br>Country<br>Language<br>LegalTextToBeRendered | |
| LegalTextURI | A | M | 1 | The URI identifying the legal text. | anyURI |
| UserConsentRequired | A | M | 1 | "TRUE" = User consent is required.<br>"FALSE" = User consent is not required to the legal text. | Boolean |
| Country | E2 | NM/TM | 1..N | List of countries for which the legal text is applicable. Each value may be a three character string according to ISO 3166-1 alpha-3 | String |
| Language | E2 | NM/TM | 1 | Language in which the legal text is given. Value may be a three character string according to ISO 639-2 alpha standard for language codes. | String |
| LegalTextToBeRendered | E2 | O | 0..N | Legal text that is intended to be rendered. Possibly in multiple languages. | String |
| . . . | | | | | |

Figure 5

| Name | Type | Category | Cardinality | Description | Data Type |
|---|---|---|---|---|---|
| PurchaseData | E | | | Attributes:<br>id<br>version<br>validFrom<br>validTo<br><br>Sub-elements:<br>Description<br>PriceInfo<br><br>LegalText<br>UserRating<br>ExtensionURL<br>PurchaseItemIDRef<br>PurchaseChannelIDRef<br>PreviwDataIDRef<br>PromotionInfo | |
| . . . | | | | | |
| | | | | Start of program guide<br><br>Program Guide elements:<br>Description<br>PriceInfo<br>LegalText<br>UserRating<br>ExtensionURL | |
| . . . | | | | | |
| LegalText | E1 | NO/TM | 0..N | Attributes:<br>LegalTextType<br>LegalTextURI<br>UserConsentRequired<br><br>Sub-elements:<br>Country<br>Language<br>LegalTextToBeRendered | |
| LegalTextType | A | NM/TM | 1 | The type of legal text<br>1 – Display before purchasing or subscribing.<br>2 – Display before playout. | unsignedByte |
| LegalTextURI | A | NM/TM | 1 | The URI uniquely identifying the legal text. | anyURI |
| UserConsentRequired | A | NM/TM | 1 | "TRUE" = User consent is required to the legal text.<br><br>"FALSE" = User consent is not required to the legal text. | Boolean |
| Country | E2 | NM/TM | 1..N | List of countries for which the legal text may be applicable. Each value is a three character string according to ISO 3166-1 alpha-3 | String |
| Language | E2 | NM/TM | 1 | Language in which the legal text is given. Value may be a three character string according to ISO 639-2 alpha standard for language codes. | String |
| LegalTextToBeRendered | E2 | NO/TM | 0..N | Legal text that is intended to be rendered. Possibly in multiple languages. | String |
| . . . | | | | | |

Figure 6A

| Name | Type | Category | Cardinality | Description | Data Type |
|---|---|---|---|---|---|
| PurchaseData | E | | | Attributes:<br>id<br>version<br>validFrom<br>validTo<br><br>Sub-elements:<br>Description<br>PriceInfo<br>LegalText<br>UserRating<br>ExtensionURL<br>PurchaseItemIDRef<br>PurchaseChannelIDRef<br>PreviewDataIDRef<br>PromotionInfo | |
| . . . | | | | | |
| | | | | Start of program guide<br><br>Elements:<br>Description<br>PriceInfo<br>LegalText<br>UserRating<br>ExtensionURL | |
| . . . | | | | | |
| LegalText | E1 | NO/TM | 0..N | Attributes:<br>LegalTextType<br>LegalTextURI<br>UserConsentRequired<br><br>Sub-elements:<br>Country<br>Language<br>PreviewDataIDRef<br>LegalTextToBeRendered | |
| LegalTextType | A | NM/TM | 1 | 1 – Display before purchasing or subscribing<br>2 – Display before playout. | unsignedByte |
| LegalTextURI | A | NM/TM | 1 | The URI identifying the legal text. | anyURI |
| UserConsentRequired | A | NM/TM | 1 | "TRUE" = User consent is required to the legal text.<br><br>"FALSE" = User consent is not required to the legal text and does not need to be confirmed in the subscription message | Boolean |
| Country | E2 | NM/TM | 1..N | List of countries for which the legal text is applicable. | String |
| Language | E2 | NM/TM | 1 | Language in which the legal text is given. | String |
| PreviewDataIDRef | E2 | NO/TM | 0..N | Reference to the PreviewData fragment which carries the representation of legal text.<br>Attribute<br>usage | anyURI |
| usage | A | NM/TM | 1 | Possible values:<br>8. Legal text | unsignedByte (8bit) |
| LegalTextToBeRendered | E2 | NO/TM | 0..N | Legal text that is intended to be rendered. Possibly in multiple languages. | String |
| . . . | | | | | |

Figure 6B

| Name | Type | Category | Cardinality | Description | Data Type |
|---|---|---|---|---|---|
| PurchaseChannel | E | | | Attributes:<br>id<br>version<br>validFrom<br>validTo<br>RightsIssuerURI<br><br>Sub-elements:<br>Selector<br>Name<br>Description<br>ContactInfo<br>PortalURL<br>PurchaseURL<br>LegalText<br>ExtensionURL | |
| | | | | Start of program guide<br><br>Name<br>Description<br>Contact_info<br>PortalURL<br>PurchaseURL<br>LegalText<br>ExtensionURL | |
| LegalText | E1 | NO/TM | 0..N | Attributes:<br>LegalTextType<br>LegalTextURI<br>UserConsentRequired<br>Sub-elements:<br>Country<br>Language<br>LegalTextToBeRendered | |
| LegalTextType | A | NM/TM | 1 | The type of legal text<br>1 – Display before purchasing or subscribing.<br>2 – Display before playout. | unsigned Byte |
| LegalTextURI | A | NM/TM | 1 | The URI uniquely identifying the legal text. | anyURI |
| UserConsentRequired | A | NM/TM | 1 | "TRUE" = User consent is required to the legal text.<br>"FALSE" = User consent is not required to the legal text. | Boolean |
| Country | E2 | NM/TM | 1..N | List of countries for which the legal text is applicable. | String |
| Language | E2 | NM/TM | 1 | Language in which the legal text is given. | String |
| LegalTextToBeRendered | E2 | NO/TM | 0..N | Legal text that is intended to be rendered. Possibly in multiple languages.<br>The language is expressed using built-in XML attribute xml:lang with this element. | String |
| . . . | | | | | |

Figure 7

| Name | Type | Category | Cardinality | Description | Data Type |
|---|---|---|---|---|---|
| PricingInfoResponse | E | | | Contains the following attributes:<br>requestID<br>globalStatusCode<br>Contains the following elements:<br>PurchaseItemPrice<br>ServiceGuideFragment<br>LegalText | |
| ... | | | | | |
| LegalText | E1 | O | 0..1 | Attributes:<br>LegaltextURI<br>UserConsentRequired<br>Sub-elements:<br>Country<br>Language<br>LegalTextToBeRendered | |
| LegalTextURI | A | M | 1 | The URI identifying the legal text. | anyURI |
| UserConsentRequired | A | M | 1 | "TRUE" = User consent is required to the legal text.<br>"FALSE" = User consent is not required to the legal text. | Boolean |
| Country | E2 | NM/TM | 1..N | List of countries for which the legal text is applicable. | String |
| Language | E2 | NM/TM | 1 | Language in which the legal text is given. | String |
| LegalTextToBeRendered | E2 | O | 0..N | Legal text that is intended to be rendered. | String |

Figure 8A

| Name | Type | Category | Cardinality | Description | Data Type |
|---|---|---|---|---|---|
| Service Request | | | | Contains the following attributes:<br>requestID<br>spr-7Version<br><br>Contains the following elements:<br>UserConsentAnswer<br>UserID<br>DeviceID<br>ServiceProtectionProtocol<br>BroadcastMode<br>BSDAid<br>PurchaseItemPrice<br>ServiceID<br>DrmProfileSpecificPart | |
| ... | | | | | |
| UserConsentAnswer | E1 | O | 0..1 | Signals whether user agreed to the legal text as represented by LegalTextURI.<br><br>Attribute:<br>LegalTextURI | Boolean |
| LegalTextURI | A | M | 1 | The URI uniquely identifying the legal text. | AnyURI |

Figure 8B

| Name | Type | Category | Cardinality | Description | Data Type |
|---|---|---|---|---|---|
| LTKRenewalReq | E | | | Attributes:<br>requestID<br>spr-7Version<br><br>Elements:<br>UserConsentAnswer<br>UserID<br>DeviceID<br>PurchaseItemID | |
| ... | | | | | |
| UserConsentAnswer | E1 | O | 0..1 | Attribute:<br>LegalTextURI | Boolean |
| LegalTextURI | A | M | 1 | The URI identifying the legal text. | AnyURI |

Figure 8C

| Name | Type | Category | Cardinality | Description | Data Type |
|---|---|---|---|---|---|
| TokenRequest | E | | | Attributes:<br>requestID<br>spr-7Version<br>Elements:<br>UserConsentAnswer<br>UserID<br>DeviceID<br>BSDAid<br>RequestedTokenAmount<br>DrmProfileSpecificPart | |
| ... | | | | | |
| UserConsentAnswer | E1 | O | 0..1 | Attribute:<br>LegalTextURI<br>Signature | Boolean |
| LegalTextURI | A | M | 1 | The URI identifying the legal text. | AnyURI |
| Signature | A | O | 0..1 | Digital signature | String |

Figure 8D

LEGAL TEXT DISTRIBUTION AND PROCESSING IN MOBILE BROADCASTING

FIELD OF ART

The invention relates generally to a method and system for distributing legal text. Specifically, the invention relates to a system and method for providing legal text for content and services available in broadcast networks.

BACKGROUND

The purchase of and subscription to digital content is often accompanied by terms and conditions to which a purchaser or subscriber must agree prior to completion of the transaction. Terms and conditions may include copyright and licensing agreements, payment agreements and the like. The legal text associated with the terms and conditions must typically be presented to the purchaser or subscriber for his or her perusal in order for the terms and conditions to be legally binding. In one example, customers purchasing digital content on the Internet are usually required to view and agree to terms and conditions that include copyright notices. That is, the customers must agree not to use the digital content illegally (e.g., in violation of the content's copyright) prior to being allowed to download or view the content. In many instances, the customer is required to acknowledge that he or she has reviewed and agreed to the terms and conditions.

With the increasing demand for mobile digital broadcasting, support for the distribution and enforcement of legal text is needed to insure that broadcast content is not misused or misappropriated. Current digital broadcast networks and systems generally do not provide legal text support in the distribution of broadcast content. As such, content providers might not be able to claim violation of terms and conditions of a purchase or subscription and/or receive compensation for the violation.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A legal text distribution and processing system allows a content provider to distribute legal text to a terminal prior to or in association with a content purchase or subscription. A legal text provider may initially create purchase fragments including the legal text information and one or more attributes such as a content ID, a validity date range, a country code, a language associated with the legal text and the like. The purchase fragments may be sent to an electronic service guide (ESG) provider that may then associate the purchase fragments with particular content items and/or channels included in the service guide information. A terminal receiving broadcast content may then receive the electronic service guide information and display the information to a user. Upon the user selecting a program for purchase, the terminal may determine whether the program is associated with a legal text element. If so, the terminal may further determine whether the legal text element includes the legal text to be rendered. If the legal text to be rendered is included, the text may be rendered for the user prior to completion of the purchase. If the legal text is not included in the legal text element, the legal text may be retrieved using a legal text identifier such as a Uniform Resource Locator (URL) or Identifier (URI).

According to one or more aspects, legal text may be retrieved from a local cache in the terminal. For example, if the terminal previously received the legal text, the terminal may have stored the legal text in a local cache and in association with a legal text URL or URI. As such, using the legal text URI or URL found in the legal text element, the legal text to be rendered may be identified and obtained from the cache. Alternatively or additionally, a terminal may obtain legal text to be rendered from a remote source such as a content server associated with the URL or URI and/or a file delivery server. For example, legal text may be delivered by the file delivery server in a carousel-like manner using File Delivery over Unidirectional Transport (FLUTE) sessions. In either case, the URL or URI may be used as a key for identifying the appropriate legal text. If the legal text to be rendered was not previously stored on the terminal, the terminal may cache the legal text upon obtaining the text to be rendered.

According to another aspect, the terminal may further determine whether user consent is required for the legal text. For example, a user may be required to consent to payment agreements and/or licensing agreements prior to receiving the requested content. If consent is required, the terminal may require the user to give consent to continue the purchase transaction. Otherwise, the transaction may be terminated. If consent is not required, however, the purchase transaction may continue processing without having to request and receive consent from the user.

According to still another aspect, legal text data and transaction messages may be communicated using various types of packets. These packets may include service guide delivery descriptors, purchase data fragments, purchase item fragments, purchase channel fragments and service provisioning messages. In one example, purchase item fragments may include legal text and parental rating information associated with a selected content item. In another example, purchase channel fragments may be sent to a terminal for characterizing a purchasable or subscribable broadcast channel. Each type of packet may include attributes and events that define characteristics of the associated channel, content or message and/or the purchase thereof.

According to yet another aspect, a broadcast network supporting legal text distribution and processing may include a service provisioning system that processes purchase and pricing responses and requests to and from a terminal. The service provisioning system may further provide legal text information including a legal text URI or URL, user consent information and/or legal text to be rendered in a response to a purchase or pricing request.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 4 illustrates a block diagram of a service guide delivery descriptor (SGDD) data structure for distributing electronic service guide information according to one or more aspects described herein.

FIG. 5 illustrates a purchase item fragment data structure according to one or more aspects described herein.

FIGS. 6A and 6B illustrate two purchase data fragment structures according to one or more aspects described herein.

FIG. 7 illustrates a block diagram of a purchase channel fragment structure according to one or more aspects described herein.

FIGS. 8A, 8B, 8C and 8D illustrate various types of service provisioning messages according to one or more aspects described herein.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
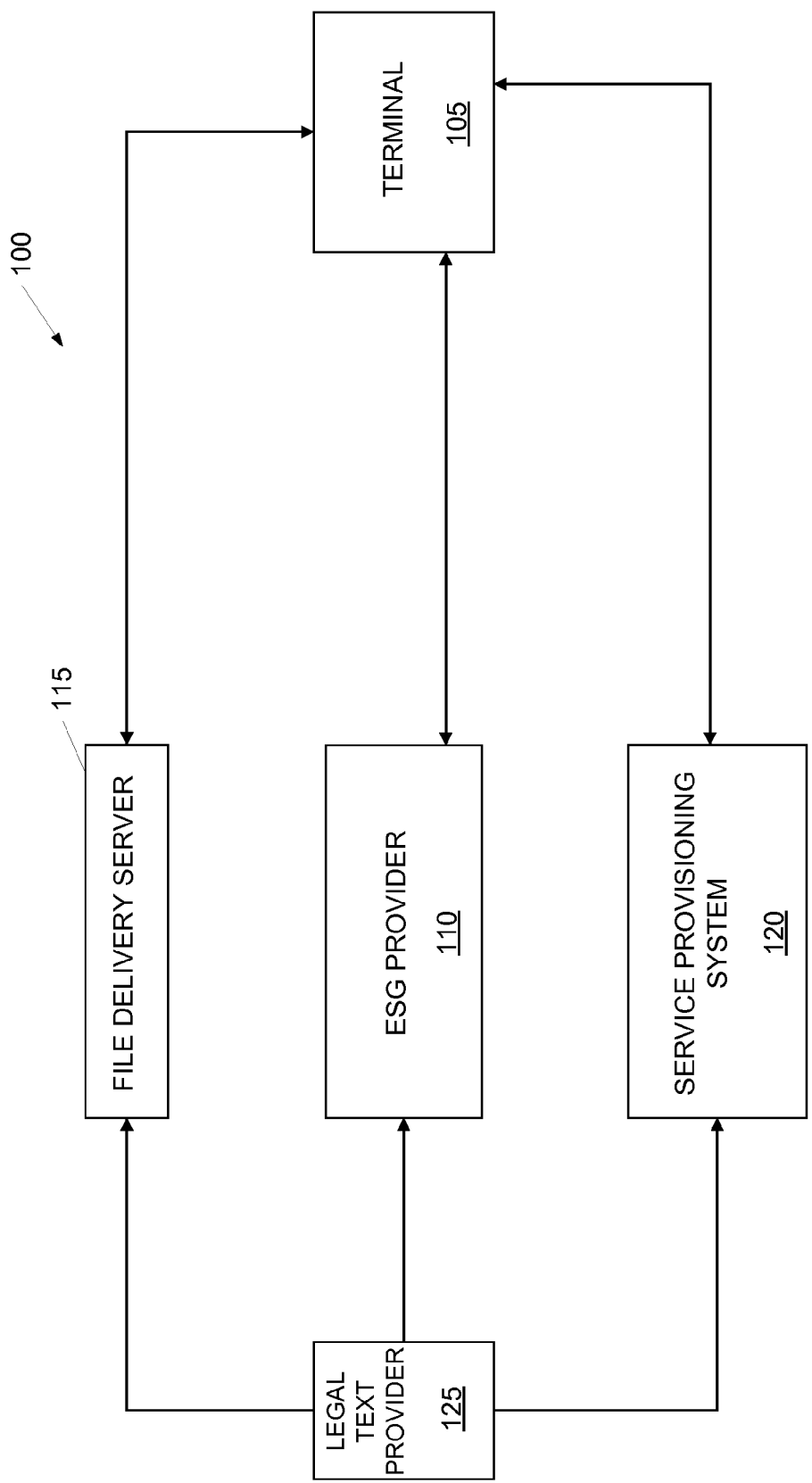
FIG. 1 illustrates a broadcast network architecture in which one or more aspects described herein may be implemented.

FIG. 1 illustrates a broadcast network system 100 including terminal 105, electronic service guide (ESG) provider 110, file delivery server 115, service provisioning system 120 and legal text provider 125. Each of the ESG provider 110, file delivery server 115 and service provisioning system 120 may be connected to terminal 105 through one or more network connections. Terminal 105 may comprise a mobile terminal, cellular phone, wireless personal data assistant (PDA), laptop or desktop personal computer (PC) and the like. The network connections may be established using a variety of communications systems including various Digital Video Broadcasting (DVB) systems, Third Generation Partnership Project (3GPP) Multimedia Broadcast/Multicast Service (MBMS), Third Generation Partnership Project 2 (3GPP2) Broadcast and Multicast Service (BCMCS), MediaFLO, wireless local area networking (WLAN), Worldwide Interoperability for Microwave Access (WiMAX) and/or Terrestrial/Satellite-Digital Multimedia Broadcasting (T/S-DMB). For example, a connection between terminal 105 and ESG provider 110 may be established using DVB-Handheld (H) system. Accordingly, terminal 105 may communicate with ESG provider 110 (or vice versa) using Internet Protocol datacasting (IPDC) over either DVB-H or various DVB systems-. Connections between each of systems 110, 115 and 120 and terminal 105 may be either bidirectional or unidirectional depending on the needs and functions of each system. In one or more configurations, broadcasts over one or more of the above systems may be performed using Open Mobile Alliance (OMA) BCAST. Further details regarding various aspects of OMA BCAST may be found in OMA document 'Mobile Broadcast Services' Draft Version 1.0—19 Apr. 2006; OMA-TS-BCAST_Services-V1_0-20060419-D and in OMA document 'Service Guide for Mobile Broadcast Services' Draft Version 1.0—12 Oct. 2006 OMA-TS-BCAST_ServiceGuide-V1_0_0-20061012-D.

Legal text provider 125 may be connected to each of ESG provider 110, file delivery server 115 and provisioning system 120 through either wired or wireless network connections using one or more of the protocols described herein. In one or more configurations, legal text provider 125 might not maintain a direct connection with terminal 105. As such, data such as legal text may be transmitted through an intermediary system like ESG provider 110, file delivery server 115 and/or provisioning system 120. Data typically transmitted from systems 110, 115 and 120 to terminal 105 may be configured such that legal text data is incorporated into the data transmission from systems 110, 115 and 120. Legal text provider 125 may be configured to provide legal information associated with various types of broadcast content. For example, a movie broadcast over a network may be subject to a copyright agreement. As such, the agreement may be provided by legal text provider 125. Legal text provider 125 may further perform enforcement functions. In one example, a user of terminal 105 may purchase a movie at a discounted rate and in exchange agree to accept 2 hours worth of advertising. In such an instance, legal text provider 125 may monitor advertising information accepted by terminal 105 and enforce the agreement.

File delivery server 115 may be configured to receive and store legal text information from legal text provider 125 and to coordinate and distribute the information to terminal 105. Accordingly, in one or more configurations, file delivery server 115 may include a database for storing legal text information. File delivery may be conducted over file delivery sessions using various data transmission protocols such as FLUTE and/or Asynchronous Layered Coding (ALC) to identify the data being sent.

ESG provider 110 is generally configured to generate and provide service guide information and/or program specific information (PSI) to broadcast recipients like terminal 105. Service guide information may provide time and channel information associated with a particular program. The information provided by ESG provider 110 may also include content purchasing information and schedules. In one or more arrangements, ESG provider 110 may embed legal text information into service guide or program specific information so that, upon delivery, terminal 105 may identify programs that require agreements to legal text.

Service provisioning system 120 may be configured to receive and process purchase and/or subscription requests initiated by terminal 105. In addition, provisioning system 120 may determine be used to enforce legal text rules associated with certain content. For example, content requested by terminal 105 may be subject to a copyright agreement. As such, if a user of terminal 105 does not agree to the copyright agreement, the content might not be distributed to terminal 105. Service provisioning system 120 may thus evaluate terminal 105's response to legal text and determine whether one or more legal text rules have been satisfied. Furthermore, service provisioning system 120 may store content in a local database and control the distribution thereof. Alternatively or additionally, service provisioning system 120 may store at least access information such as a location from which content may be obtained and/or access authorization data (e.g., login information).

Service provisioning system 120, file delivery server 115 and ESG provider 110 may be separate entities or, in some instances, be combined as components of a single server or system. If systems 110, 115 and 120 are combined, a router (not shown) within the combined system (not shown) may be configured to receive information from either terminal 105 or legal text provider 125 and distribute the information based on an intended destination and/or content. For example, a router in a combined system may direct purchase requests to service provisioning system 120 while routing legal text requests to file delivery server 115.

Figure 2:
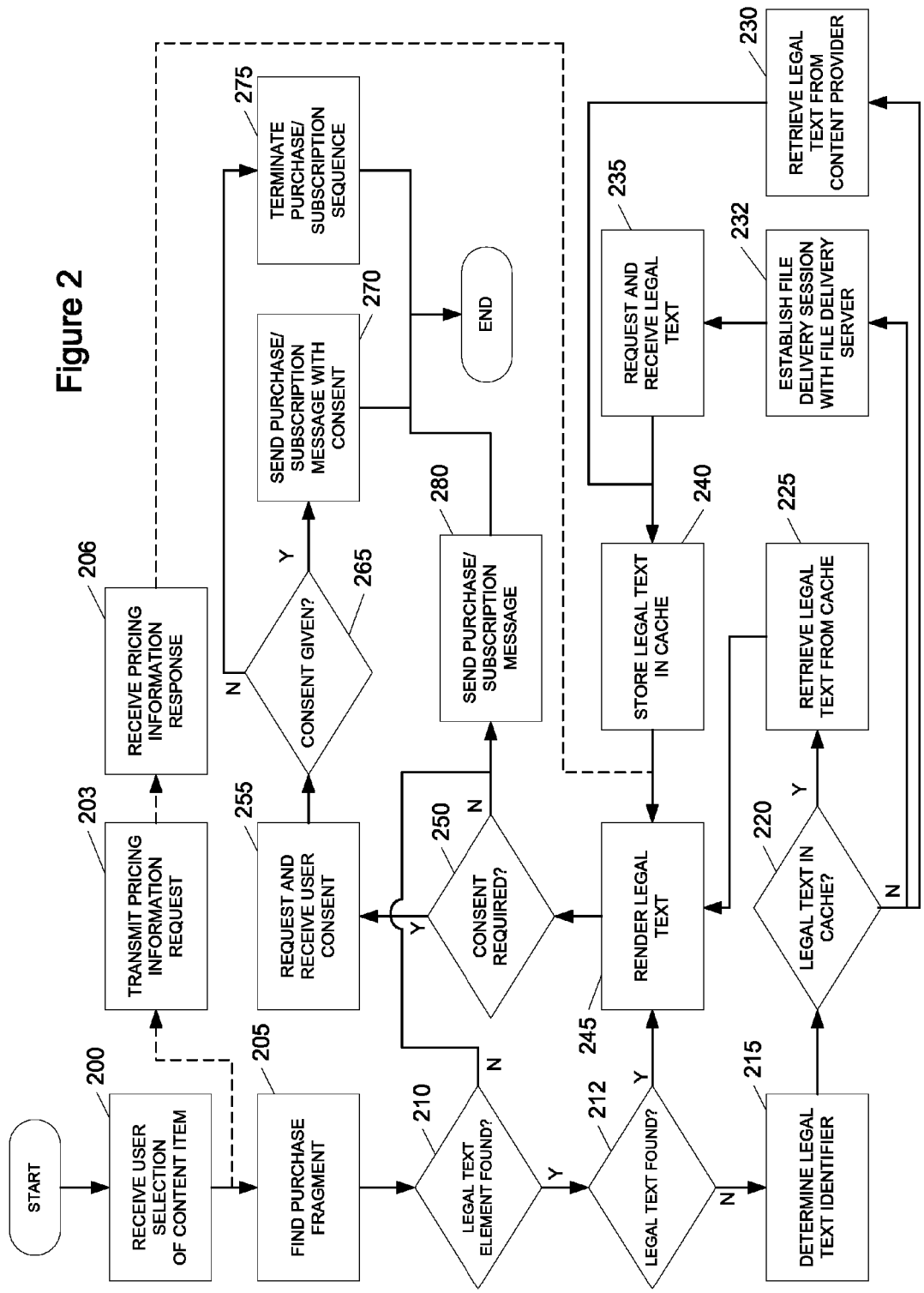
FIG. 2 is a flowchart illustrating a method for processing legal text in a broadcast network according to one or more aspects described herein.

FIG. 2 is a flowchart illustrating a method for accessing content having corresponding legal text. In step 200, a user may select a content item to purchase or subscribe to from received ESG information. In response to the selection, a terminal may identify a corresponding purchase item fragment associated with the selected content from ESG information in step 205. Purchase item fragments relate to a data structure that represents a group of one or more services (e.g., a service bundle) or one or more content items offered to an end user. In addition to channel and schedule information for various programs and content, ESG data may further include purchase information such as cost, payment options and/or legal text. Accordingly, in step 210, the terminal may determine whether the purchase item fragment of the selected content includes a legal text element. If a terminal determines that a legal text element is not found in the purchase item fragment, the purchase or subscription message may be sent to a content provider or provisioning system in step 280. If, however, a legal text element is found in step 210, the terminal may further determine whether the legal text to be rendered is stored in the legal text element in step 212. For example, legal text may be stored as a text string attribute within a legal text element. If the terminal finds the legal text to be rendered within the legal text element, the terminal may proceed to render the legal text in step 245. For example, the legal text may be displayed on a screen of the terminal for a user to review. If, however, the legal text to be rendered is not found in the legal text element, the terminal may instead retrieve a legal text location identifier, e.g., a URL or URI that identifies the legal text associated with the selected content item in step 215.

In step 220, the terminal may determine whether or not the legal text is cached in a local memory of the terminal using the legal text URL or URI as a key or identifier. If the terminal determines that the legal text corresponding to the URL is cached in the local database, the terminal may retrieve the legal text using the URL or other identifier and render the legal text in steps 225 and 245, respectively. In one or more arrangements, legal text cached in a terminal's memory may be stored in association with a key. The key, for example, may be a URL or URI associated with a location at which the legal text may be found and retrieved.

If, on the other hand, the terminal determines in step 220 that the legal text is not cached in local memory, the terminal may obtain the legal text using one of at least two methods. One method, as illustrated in step 230, is for a terminal to retrieve the legal text by accessing the specified legal text URL or identifier over a network connection. For example, the legal text URL may be used to access a webpage or content server storing the relevant legal text. Alternatively, a terminal may retrieve legal text by establishing a file delivery session with a file delivery server in step 232. The file delivery session may be established using a session identifier included in received ESG information. Since delivery sessions may be used for multiple types of file deliveries, a terminal may be informed when the specific delivery session is transmitted so that the receiver can be turned on at the appropriate and corresponding time. The terminal may then request and receive the legal text from the file delivery server using the legal text URL in step 235. In either instance, once the legal text has been obtained by the terminal, the legal text may be stored in the terminal's local memory in association with the legal text URL in step 240. After the legal text is stored, the text may subsequently be rendered on a display for review by the user in step 245.

Upon rendering the legal text in step 245, the terminal may determine whether or not the legal text is associated with a user consent requirement in step 250. That is, the terminal may determine whether a user's acknowledgment of or consent to the legal text is required for subscription or purchase of the selected content. Such a determination may be made based on whether a consent requirement flag is set in the legal text element of the purchase item fragment. If user consent is required, the terminal may request consent from the user in step 255. For example, the terminal may display a consent request message to the user and prompt the user for a response. Additionally, the terminal may receive user input corresponding to a response to the consent request message also in step 255. The terminal may then determine whether or not the user's input corresponds to consent to the legal text in step 265. If the input indicates that the user consents to the legal text, the user's consent and the legal text identifier may be transmitted along with a purchase/subscription message in step 270 to, for example, a service provisioning system. If, however, the user's input does not correspond to consent, the content selection and purchase sequence may be terminated in step 275.

Alternatively, if the terminal determines that user consent is not required in association with the legal text in step 250, the purchase or subscription message may be transmitted in step 280. A subscription or purchase message may be transmitted to a content provider or an intermediary system such as service provisioning system 120 of FIG. 1 where the selected content is retrieved and transmitted to the requesting terminal. Subscription and purchase messages may include a variety of information including payment information (e.g., credit card numbers, check numbers, etc.), authorization information, content identification data and/or combinations thereof.

In one or more alternate configurations, a terminal may initially send a content item request to a service provisioning system in step 203 upon detecting a user's selection of the content item. In response to the request, the terminal may receive a response to the request including information associated with the content item such as pricing information, a legal text identifier (e.g., URL or URI), legal text to be rendered and/or consent requirement information in step 206. Once the legal text to be rendered and the legal text identifier has been received at the terminal, the terminal may then cache the information in local memory, as illustrated in step 240. The content selection and purchase process may proceed as described in steps 245-280.

Figure 3:
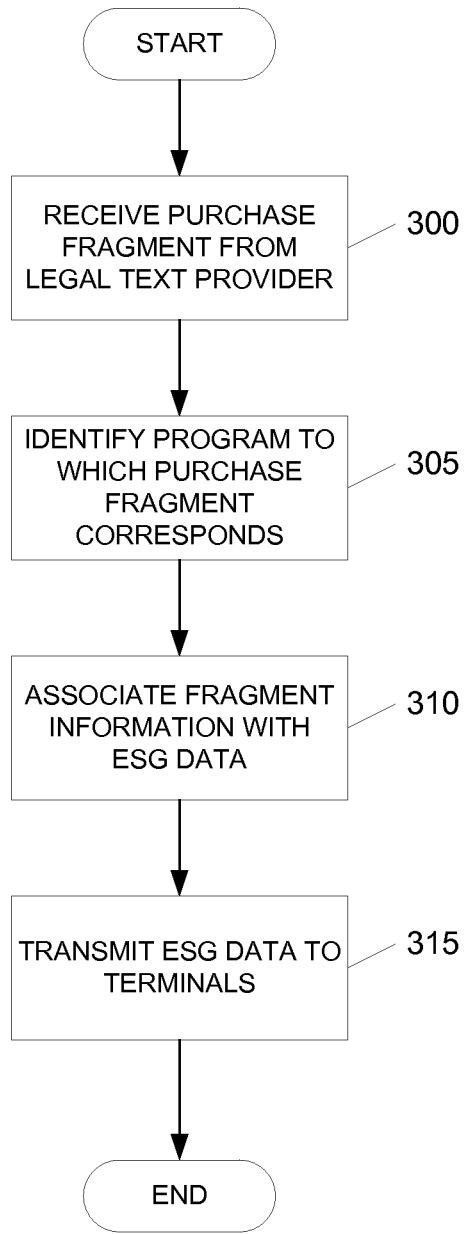
FIG. 3 is a flowchart illustrating a method for delivering legal text information to a terminal according to one or more aspects described herein.

FIG. 3 is a flowchart illustrating a method for delivering legal text information to a terminal. In step 300, an ESG provider may receive purchase item fragment information from a legal text provider such as legal text provider 125 in FIG. 1. Purchase item fragment information may be updated in the ESG provider according to a predefined schedule and/or upon new purchase item fragment information being added. In step 305, the ESG provider may analyze the purchase item fragment information to identify a program to which the fragment information corresponds. Such an analysis may include identifying a title, identifier and/or schedule information associated with the purchase item. Once a corresponding program has been identified in the ESG data, the purchase item fragment information may be embedded and/or otherwise associated with the ESG data in step 310. For example, each program entry in the ESG information may include a legal text or purchase field that may be used to store the purchase item fragment information. In step 315, the ESG provider may transmit the ESG information to one or more subscribing terminals such as terminal 105 of FIG. 1.

FIG. 4 illustrates part of a definition table for a service guide delivery descriptor data (SGDD) structure for distributing electronic service guide information. The SGDD stored in the data structure may include one or more sub-elements such as a notification reception field, a legal text reception field and a descriptor entry. The legal text reception element may further include sub-elements such as a legal text reception port and a legal text reception address. The legal text reception sub-element may be used to configure a channel for receiving legal text information through a network. A data type may be specified for each data field. For example, the legal text reception port may be expressed as an integer while the legal text reception address disclosed as an IP multicast address may be expressed as a string of characters.

FIG. 5 illustrates a structure of a purchase item fragment. Each purchase item fragment may store a variety of attributes including an ID, a version, a valid from attribute, a valid to attribute, a global purchase item ID, a weight and a closed attribute. An attribute 'closed' may be used to indicate that a purchase item is closed for new subscribers, while an attribute 'weight' may be used to express or indicate the intended order of display (e.g., to the end user) of the corresponding purchase item relative to other purchase items. For example, the valid from and valid to attribute may define a date range during which the purchase item fragment is valid. Purchase item fragments may further include sub-elements such as start time, end time, parental rating and legal text. Start time and end time, for example, specifies the start time and end time of the content item to which the purchase item fragment corresponds. The legal text sub-element may be qualified by sub-elements and attributes including a legal text URI attribute, a user consent attribute, a country sub-element, a language sub-element and a legal text to be rendered sub-element. A legal text URI attribute, for instance, may uniquely identify the legal text. Additionally, a user consent attribute may be used to determine whether user consent is required to confirm a purchase or subscription of corresponding content. The country sub-element may be configured to specify one or more countries to which the legal text is applicable. For example, a copyright agreement may be applicable in the United States but not in China. A language sub-element may be used to specify a language in which the legal text is provided. The value stored by the language sub-element may include a three character string in accordance with an ISO 639-2 alpha standard for language codes. Further, the legal text to be rendered sub-element may be used to store the legal text that is intended to be rendered by a terminal for review by a user. In one or more arrangements, legal text to be rendered may store multiple text strings corresponding to the same text string in multiple different languages. Further, a category column may be included to indicate whether a sub-element or attribute is optional (O) or mandatory (M) for a network (N) or a terminal (T) (e.g., NM=network mandatory, TM=terminal mandatory). Cardinality, on the other hand, may specify a number of instantiations of an element or sub-element that the fragment references. For example, a fragment may reference a legal text in multiple languages. As such, the cardinality column may specify the number of languages or instantiations of an element or sub-element that exist.

FIG. 6A illustrates a structure of a purchase data fragment. Similar to a purchase item fragment, a purchase data fragment may include attributes such as ID, version, valid from and valid to. Purchase data fragments may be used to represent information associated with a particular purchase item including pricing information and promotional information. Purchase data fragments may also be associated with purchase channels. A purchase data fragment may further include a legal text sub-element similar to the purchase item fragment. In contrast to a purchase item fragment, purchase data fragments may include a legal text type attribute that specifies when the legal text is to be rendered and displayed to the user. For example, if the legal text type attribute is flagged as '1,' the legal text is displayed prior to purchase and/or subscription. In another example, if the legal text type attribute is assigned a value of '2,' the legal text may be displayed prior to playing the purchased or subscribed content or service. As such, in one or more configurations, a terminal may evaluate a text type attribute prior to displaying the legal text to be rendered.

FIG. 6B illustrates an alternate version of a purchase data fragment according to one or more arrangements. In the purchase data fragment of FIG. 6B, the legal text element may further include a preview data ID reference. The preview data ID reference may be used to store a reference to the preview data fragment that stores the legal text to be rendered. Thus, if the legal text to be rendered is not stored in the purchase data fragment, the text may be retrieved using the preview data ID reference information. A usage attribute of the preview data ID reference may specify how the referenced information is to be used (e.g., as legal text). Alternatively or additionally, the legal text element may be stored outside of the program guide data. For example, the legal text element may be stored before or after the program guide information.

FIG. 7 illustrates a structure of a purchase channel fragment. Purchase channel fragments may be used to define one or more attributes and/or elements of a channel rather than individual programs of content items. For example, a purchase channel fragment may include information about the entity from which access and/or content rights were purchased. The purchase channel fragment may include attributes and elements similar to those found in a purchase item or data fragment. For example, a purchase channel fragment may include a legal text sub-element that stores attributes such as legal text type, legal text URI and user consent. The legal text sub-element may further include sub-elements including country, language and legal text to be rendered elements.

FIGS. 8A, 8B, 8C and 8D illustrate various types of service provisioning messages. For example, FIG. 8A corresponds to a pricing information response message. The pricing information response message includes attributes such as request ID and global status code. The request ID may identify the request to which the response corresponds. Global status codes, on the other hand, are codes for expressing the result of a query such as success, failure, error etc. Global status codes are further described in OMA document "Mobile Broadcast Services," Draft Version 1.0—19 Apr. 2006, OMA-TS-BCAST_Services-V1_0-20060419-D. The pricing information response message may further include elements such as purchase item price, service guide fragment and legal text. The service guide fragment may include information or a reference to information relating to a portion of a service guide. For example, service guide fragments may include interactivity data, schedule information and preview data. The purchase item price element may define the price associated with the content or service item. A legal text element may include information such as a legal text URI attribute, a user consent attribute and sub-elements country, language and legal text to be rendered.

FIG. 8B, on the other hand, illustrate a provisioning request message structure. Provisioning request messages may be used for a variety of purposes such as service requests, long-term key renewal requests and token purchase requests. Service requests may be used to request subscription to or purchase of a content item. A service request message may include a user consent answer element and a legal text identifier element. The user consent answer elements may be used to store and carry a user's response to a consent requirement, while the legal text URI attribute may be used to identify a relevant legal text. A provisioning system may use the user consent answer to determine whether content or services should be distributed to the terminal and user.

FIG. 8C illustrates a long-term key renewal request message structure that may be used for renewing a content item or group of content items that were previously purchased or subscribed to. Similar to the service request message, a long term key renewal request message may include user consent answer and legal text URI elements. The long term key renewal request message and the various elements and attributes thereof (e.g., legal text URI elements) may be used in the event the terms and conditions associated with a service or content item has changed since a previous update.

In another example, FIG. 8D illustrates a structure of a token purchase request message that may be used to purchase tokens or credits to enable future consumption of broadcast services or content. In addition to a user consent answer element and a legal text URI element, a token purchase request message may further include a digital signature element. The digital signature element may be used to authenticate the purchasing or requesting user or terminal.

Figure 9:
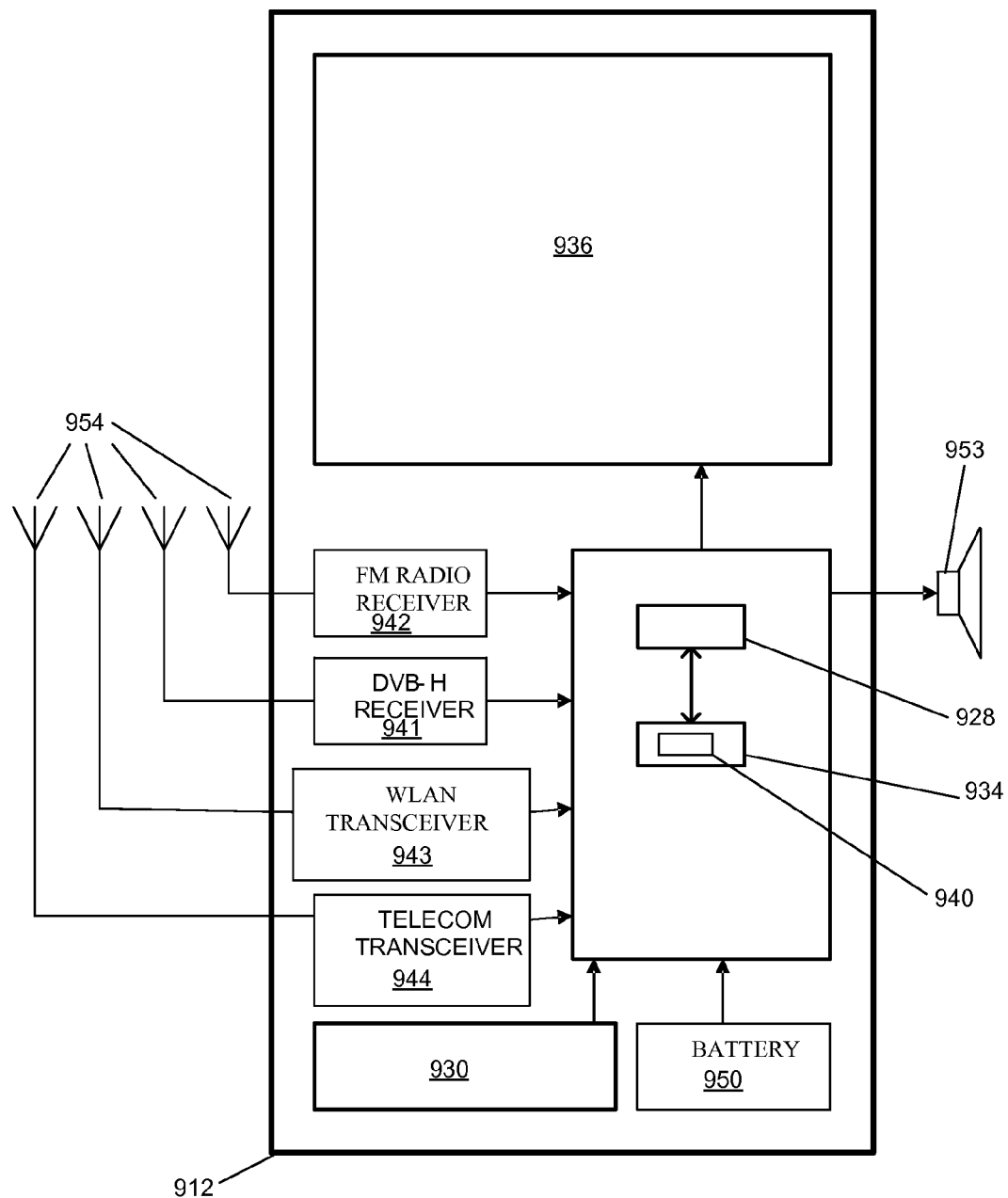
FIG. 9 illustrates a block diagram of a mobile terminal according to one or more aspects described herein.

FIG. 9 illustrates a block diagram of a terminal such as mobile terminal 105 of FIG. 1 including processor 928 connected to user interface 930, memory 934 and/or other storage, and display 936. Mobile terminal 912 may also include battery 950, speaker 952 and antennas 954. User interface 930 may further include a keypad, touch screen, voice interface, one or more arrow keys, joy-stick, data glove, mouse, roller ball, touch screen, or the like.

Computer executable instructions and data used by processor 928 and other components within mobile terminal 912 may be stored in a computer readable memory 934. The memory may be implemented with any combination of read only memory modules or random access memory modules, optionally including both volatile and nonvolatile memory. Software 940 may be stored within memory 934 and/or storage to provide instructions to processor 928 for enabling mobile terminal 912 to perform various functions. Alternatively, some or all of mobile device 912 computer executable instructions may be embodied in hardware or firmware (not shown).

Mobile terminal 912 may be configured to receive, decode and process digital broadband broadcast transmissions that are based, for example, on the DVB standard, through a specific DVB receiver 941. The mobile device may also be provided with other types of receivers for digital broadband broadcast transmissions. Additionally, mobile terminal 912 may also be configured to receive, decode and process transmissions through FM/AM Radio receiver 942, WLAN transceiver 943, and telecommunications transceiver 944. Transceivers 943 and 944 may, alternatively, be separated into individual transmitter and receiver components (not shown). In one aspect of the invention, mobile terminal 912 may receive Radio Data System (RDS) messages.

Figure 10:
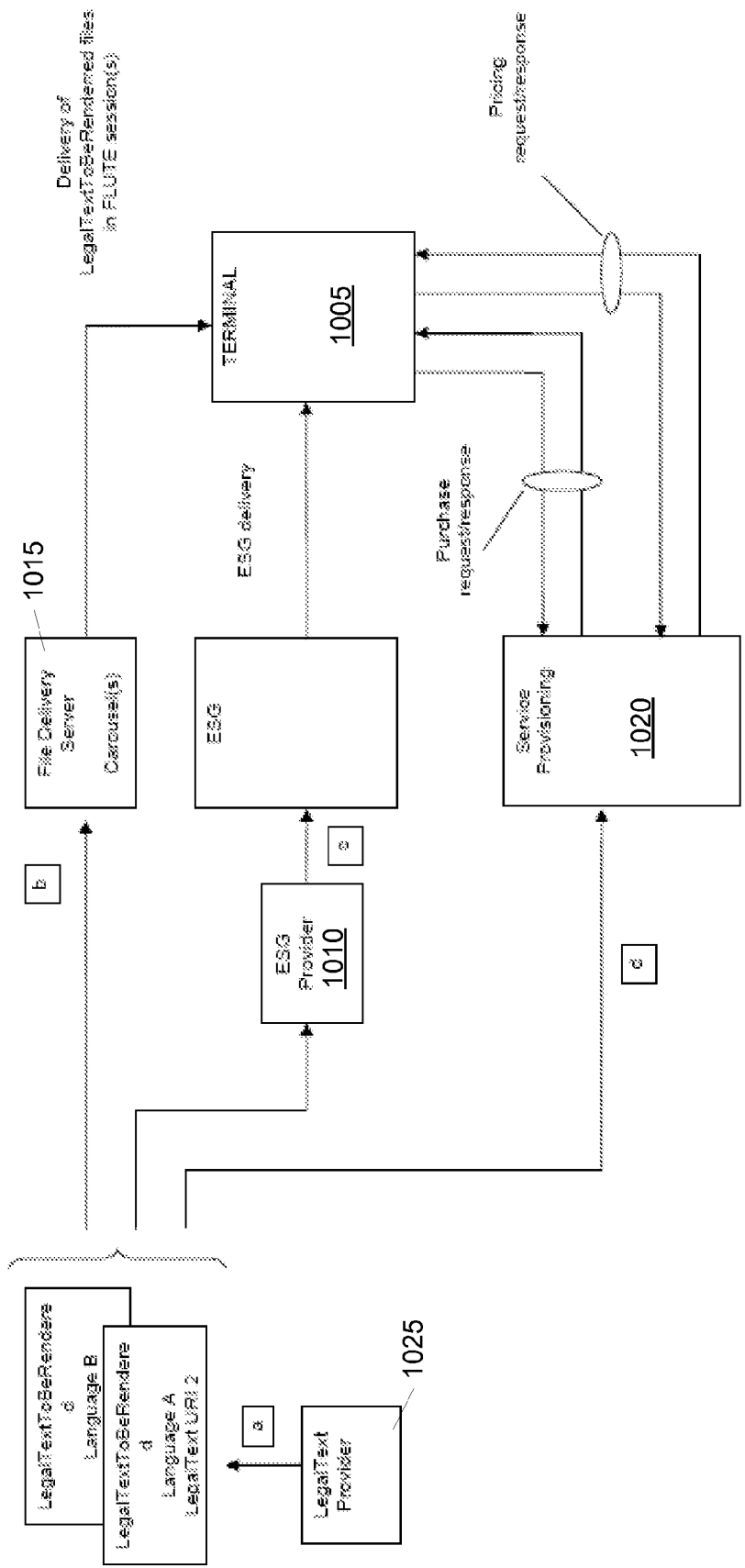
FIG. 10 illustrates a system for distributing legal text information according to one or more aspects described herein.

FIG. 10 illustrates a diagram of a system for distributing legal text information through a variety of processes. Legal text provider 1025, for example, may create and prepare legal text through process a. In one or more configurations, legal text provider 1025 may comprise at least one of a service provider, a content provider and a service provisioning provider that may cooperate in the preparation of one or several legal texts. Legal text provider 1025 may further review and approve the legal text along with any translations that may have been produced. The legal text created and prepared by legal text provider 1025 may then be distributed to terminal 1005 through three different processes b, c and d. For example, in process c, the legal text may be stored in a legal text element of a purchase data fragment that is distributed through electronic service guide data. The legal text element may further include attributes such as type, legal text URI, user consent, country and language. Thus, when terminal 1005 downloads or receives ESG information from ESG provider 1010, legal text may also be downloaded therewith.

In another example, legal text prepared according to process b may be distributed in a carousel-like manner in FLUTE sessions through file delivery server 1015. In one or more arrangements, file delivery server 1015 may prepare each legal text translation in a separate file. As such, each language version of the legal text may be separately identifiable by a URI. Alternatively, multiple translations of the same legal text may be delivered as one file having a single URI. File delivery sessions may be announced through ESG information distributed by ESG provider 1010.

In yet another example, legal text may be distributed by service provisioning system 1020 through process d. Service provisioning system 1020 may receive legal text information including legal text to be rendered and one or more applicable rules regarding the use of the legal text from legal text provider 1025. The legal text information may then be associated with and/or stored in a purchase item fragment associated with a content item and/or service item. Accordingly, when terminal 1005 requests a content item or pricing information associated with a content item, legal text information may be distributed through a purchase item fragment. In one or more configurations, different legal texts may be applied depending on the country of purchase. Thus, if a content item is purchased in China, service provisioning system 1020 may associate a Chinese translation of a first legal text with the purchase item fragment. Alternatively, if the purchasing terminal, e.g., terminal 1005, is located in France, a French translation of a second legal text may be associated with and/or stored in the purchase item fragment instead for the same content item.

In one or more arrangements, legal text information may be communicated along with various attributes and elements. For example, legal text information may be qualified by country and language elements that further characterize the information. For example, a language element may include a code identifying the language of the legal text. Further, a country element may be used to specify a list of one or more countries for which the legal text information is applicable. Accordingly, a terminal may further evaluate such elements and attributes when receiving and processing legal text information.

The various network nodes (e.g., service provisioning system, ESG provider and file delivery server) described herein may further include components such as a receiver, a transmitter, storage facilities, RAM, ROM, a processor and the like. The receiver, for example, may be used to receive legal texts from the legal text provider and the transmitter may, in one or more instances, be used to transmit legal text and/or purchase information to a requesting terminal.

Additionally, the methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

What is claimed is:

1. A method comprising:
    receiving, by a processor, a content item;
    determining, by the processor, whether the content item is associated with a legal text element, wherein the legal text element includes information related to a legal text;
    in response to determining that the content item is associated with the legal text element, determining, by the processor, whether the legal text element includes a legal text type attribute that specifies when the legal text is to be rendered; and
    based on the legal text type attribute having a non-zero value, determining, by the processor, to render the legal text prior to playing a purchased or subscribed content associated with the content item.

2. The method of claim 1, further comprising determining, by the processor, whether the legal text element includes the legal text.

3. The method of claim 2, wherein based on the legal text element not including the legal text, determining, by the processor, to obtain the legal text associated with the content item.

4. The method of claim 3, wherein obtaining the legal text associated with the content item further comprises:
    determining a legal text identifier from the legal text element; and
    retrieving the legal text using the legal text identifier.

5. The method of claim 1, further comprising:
    determining whether the legal text element includes a user consent requirement; and
    in response to determining that the legal text element includes the user consent requirement, prompting a user for consent.

6. The method of claim 5, further comprising:
    determining whether the user consents to the legal text; and
    in response to determining that the user consents to the legal text, transmitting a purchase message to a content provider.

7. The method of claim 1, further comprising the step of transmitting a purchase message to a content provider after rendering the legal text.

8. The method of claim 1, wherein in response to determining that the content item is associated with the legal text element, further comprising determining, by the processor, whether the legal text element includes a country sub-element that specifies one or more countries to which the legal text is applicable.

9. The method of claim 8, further comprising determining, by the processor, to render the legal text only when the legal text is applicable to the location of the processor.

10. A method comprising:
    receiving, by a processor, a content item;
    determining, by the processor, whether the content item is associated with a legal text element, wherein the legal text element includes information related to a legal text;
    in response to determining that the content item is associated with the legal text element, determining, by the processor, whether the legal text element includes a country sub-element that specifies one or more countries to which the legal text is applicable; and
    based on the inclusion of a country sub-element, determining, by the processor, to render the legal text when the legal text is applicable to the location of the processor.

11. The method of claim 10, further comprising determining, by the processor, whether the legal text element includes the legal text.

12. The method of claim 11, wherein based on the legal text element not including the legal text, determining, by the processor, to obtain the legal text associated with the content item.

13. The method of claim 12, wherein obtaining the legal text associated with the content item further comprises:
    determining a legal text identifier from the legal text element; and
    retrieving the legal text using the legal text identifier.

14. The method of claim 10, further comprising:
    determining whether the legal text element includes a user consent requirement; and
    in response to determining that the legal text element includes the user consent requirement, prompting a user for consent.

15. The method of claim 14, further comprising:
    determining whether the user consents to the legal text; and
    in response to determining that the user consents to the legal text, transmitting a purchase message to a content provider.

16. The method of claim 10, further comprising the step of transmitting a purchase message to a content provider after rendering the legal text.

17. The method of claim 10, wherein in response to determining that the content item is associated with the legal text element, further comprising determining, by the processor, whether the legal text element includes a legal text type attribute that specifies when the legal text is to be rendered.

18. The method of claim 17, further comprising determining, by the processor, to render the legal text prior to playing a purchased or subscribed content associated with the content item.

* * * * *